Feb. 12, 1935.  O. S. SELLS ET AL  1,990,503
CORN HUSKING MACHINE
Original Filed July 2, 1929  2 Sheets-Sheet 1
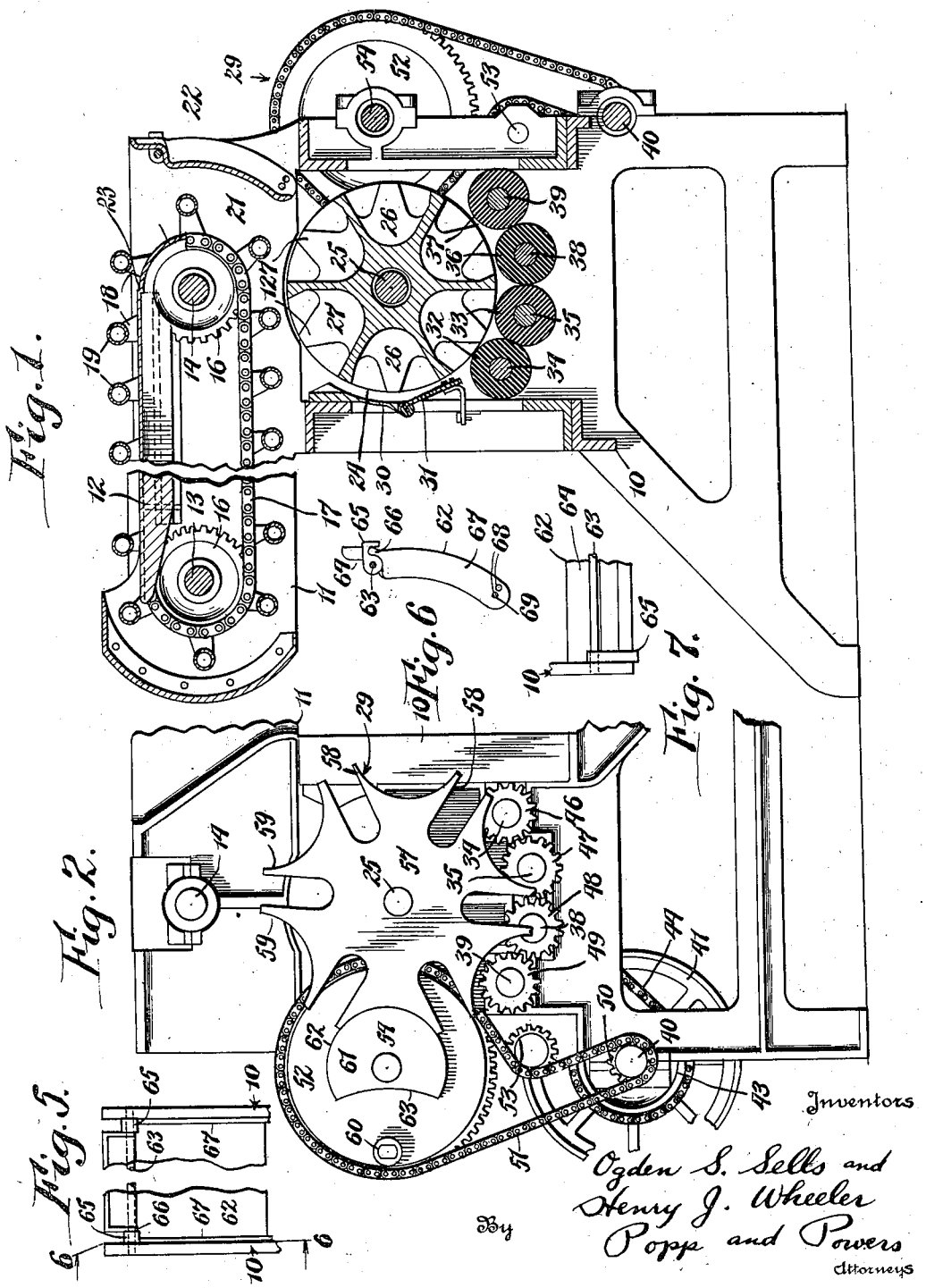
Inventors
Ogden S. Sells and
Henry J. Wheeler
By Popp and Powers
Attorneys

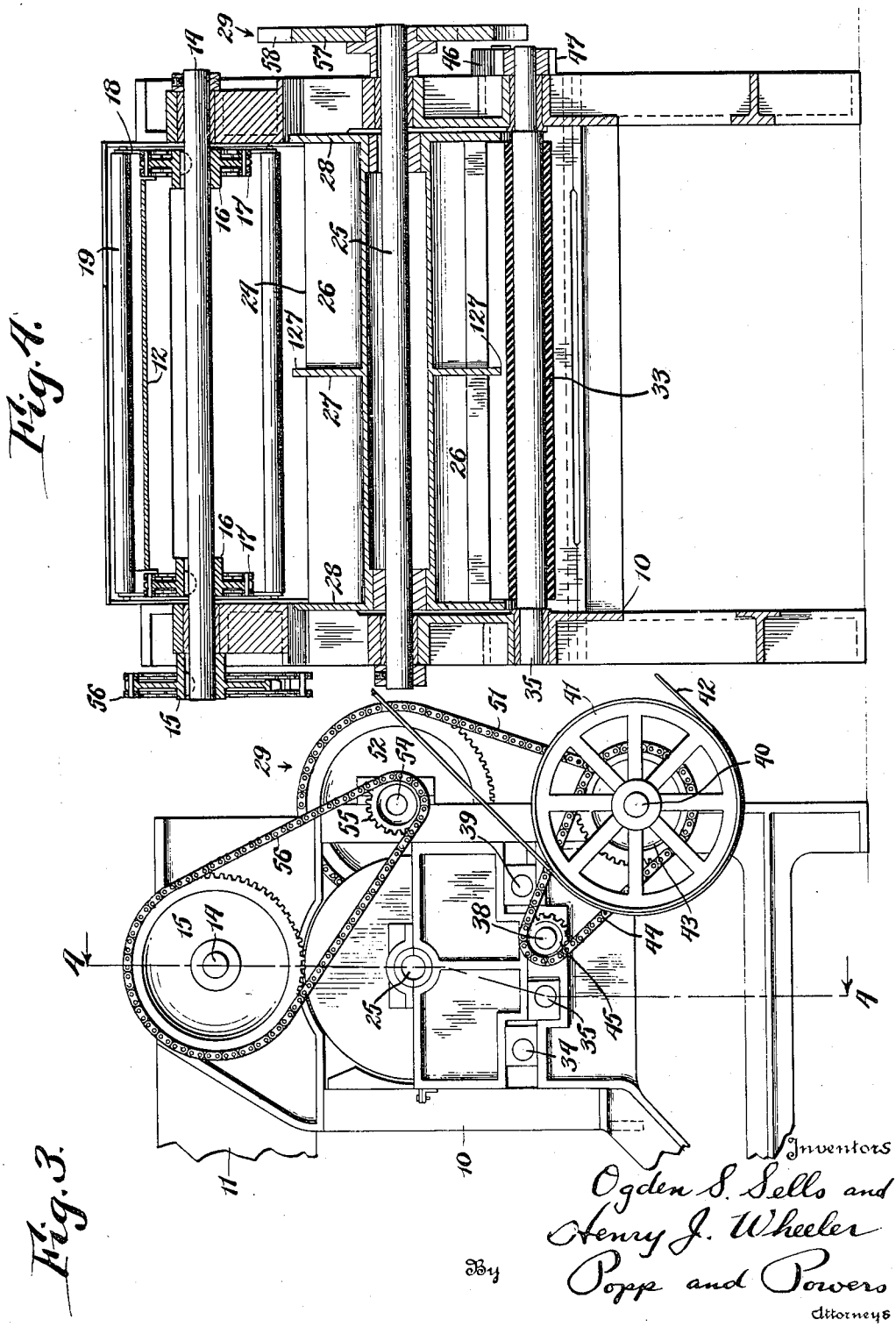

Patented Feb. 12, 1935

1,990,503

UNITED STATES PATENT OFFICE 1,990,503

CORN HUSKING MACHINE

Ogden S. Sells, San Francisco, Calif., and Henry J. Wheeler, Buffalo, N. Y., assignors to Sprague-Sells Corp., Hoopeston, Ill., a corporation of Delaware Original application July 2, 1929, Serial No. 375,445, now Patent No. 1,927,957, dated September 27, 1933. Divided and this application May 9, 1931, Serial No. 536,230

2 Claims. (Cl. 130—5)

This invention relates to a corn husking mechanism and more particularly to a corn husking mechanism in which the ears of corn are individually placed upon a conveyer which carries the ears past gaging, debutting and husk shredding devices and delivers it to a husking device from which the husked ear is discharged.

This application is a division of our co-pending application, Ser. No. 375,445, filed July 2, 1929, for Corn husking machine.

The principal object of this invention is to provide a simple and efficient corn husker of this character which severs the butt at the proper place regardless of the size or shape of the ear, and delivers the ear to a series of husking rolls against which each ear is individually held for successive periods to insure complete removal of the husks and silk.

Another aim is to provide a husker of this character in which each ear, after being debutted, is confined in an individual pocket of a rotary member which is turned by an intermittent gear mechanism and successively presents each ear to successive pairs of cooperating husking rolls and holds the ear in engagement with each pair of rolls for a definite period of time so as to insure the complete removal of the husks and silk from the ears of corn.

Other objects are to provide a husker which operates on ears of various sizes and shapes in which there is little danger of the ears becoming stuck, jammed or misplaced while passing through the machine and in which any such ears can be easily removed, and to provide a machine which is accessible for repairs and adjustments and will not readily become clogged with silk or pieces of husk.

In the accompanying drawings:

Fig. 1 is a fragmentary vertical longitudinal section through a corn husker embodying our invention. Fig. 2 is a fragmentary side elevation of the same. Fig. 3 is a fragmentary side elevation viewed from the side opposite to that shown in Fig. 2. Fig. 4 is a vertical transverse section taken on line 4—4, Fig. 3. Fig. 5 is a fragmentary rear elevation of the machine showing the removable and adjustable rear end plate. Fig. 6 is a section taken on line 6—6, Fig. 5. Fig. 7 is a fragmentary top plan view of the detail shown in Figs. 5 and 6.

The operating parts of the corn husker embodying the present invention are supported by a frame 10 which may be of any suitable construction and is preferably formed to provide an extending part 11 which supports a horizontal plate 12 forming the feeding table.

Journaled in the frame 10 at opposite ends and below the table 12 are two transverse conveyer shafts 13 and 14 the rear shaft 14 forming the driving shaft and carrying a driving sprocket 15 at one end. Each of the conveyer shafts 13 and 14 carries a pair of sprocket wheels 16 which carry a pair of conveyer chains 17. These conveyer chains 17 are arranged adjacent the sides of the table 12 and the upper stretch of each is arranged substantially even with the upper table surface as shown in Fig. 1, while the lower stretch is arranged below the table 12. Each of the conveyer chains 17 carries a plurality of spaced arms 18 which are secured to the chains in any suitable manner and project outwardly therefrom. To the outer ends of each of the corresponding pair of arms of both chains, cross rods or bars 19 are secured which extend across the table and are spaced above the upper surface of the same. The conveyer bars 19 are spaced apart a sufficient distance to form pockets accommodating the ears of corn between the same with the ears arranged parallel with the bars, and the operator places the ears between the bars at the front end of the table. As the conveyor chains 17 are turned, the ears are propelled sidewise along the table. In the preferred embodiment of the invention while the ears are conveyed along the table 12 by the bars 19 the ears are successively acted upon by placing, gaging, debutting and shredding devices but as these form no part of the present invention they are not shown. For the preferred embodiment of such placing, debutting, gaging and shredding devices reference is made to the parent application, Ser. No. 375,445, filed July 2, 1929, of which this application is a division and which shows these devices in detail.

The debutted and shredded ears are then conveyed along the feeding table 12 by the main conveyor and are carried around the rounded downturned end 20 at the rear end of the table and into a vertical way or passage 21 formed by a rear frame cross plate 22. This downturned rear part 20 of the feeding table 12 is concentric with the axis of the conveyor drive shaft 14 and to prevent the ears from being caught in the conveyor while being carried around this downturned part, the outer face of the same is spaced closer to the drive shaft 14 than the horizontal part of the feed table 12 thereby forming a step 23 between these two parts of the feed table. It has been found in practice that by the provision of this step and a relatively depressed rounded rear part 20 on the feeding table, the ears are conveyed over the end of the feeding table into the vertical way 21 easily and without danger of being caught or jammed between the conveyor bars 19 and the rounded part 20 of the table, this step or drop 23 permitting ears to drop and give more room for any husks which may have been drawn back under the bars 19 to free themselves so as to transfer efficiently to the chute 21 and not carry around with the lower stretch of the main conveyor chain 17. In machines used where the rounded part 20 formed a continuation of the horizontal part of the feeding table ears frequently became jammed or caught in the conveyor and had to be cleared. Below the vertical way or passage 21 is arranged a drum or cylinder 24 which is fixed on a transverse shaft 25, this shaft being suitably journaled in the main frame. This drum is formed to provide two series of longitudinally extending pockets 26, one series being arranged on each side of the drum and the two series being separated by a partition 27, the outer ends of the pockets being closed by end heads 28.

In order to insure the dropping of the ears into correct position in the pockets 26, the central partition 27 is preferably made star shaped, having points 127 which extend outwardly to the periphery of the drum and are located centrally with reference to the pockets. It occasionally happens that when the ears fall onto the drum 24, the tip or butt of some fall upon the central partition 27. If the central partition 27 were circular and of the same diameter as the drum, such ears would become jammed in the machine and not be properly husked and also require stopping of the machine to effect their removal. By making the central partition star shaped, the butts or points of the ears so falling engage the points 127, and cannot, of course, rest thereon but slide down into the pockets in which they are conveyed, without danger of jamming to the husking mechanism.

To this drum is imparted a step by step movement by means of a Geneva gear 29 as hereinafter described, and its movement is so synchronized with the conveyor that as a pair of ears is being discharged from the vertical way 21 by the conveyor a pocket 26 is in position to receive each of the ears and before the next pair of ears is discharged from the conveyor, the drum 24 is rotated to bring the next succeeding pair of empty pockets 26 into position to receive them. One ear is therefore received in each pocket and the ears are individually carried around by the drum 24. In front of the drum a transverse baffle plate 30 is secured to the main frame and to the lower end of this baffle plate 30 a movable baffle plate 31 is pivotally mounted, this baffle plate 31 being movable away from the drum to permit of the removal of ears from the pockets 26 and nubs or other small pieces from the front pair of husking rolls 32 and 33. The fixed baffle plate 30 is also spaced from the lower stretch of the main conveyor to provide a space therebetween through which ears improperly received in the pockets 26 of the drum 24 are caught in the main conveyor and thrown out of the machine.

While one pocket 26 is being held in position to receive an ear of corn from the main conveyor, the opposite pocket is disposed over the first pair of husking rolls 32 and 33. These husking rolls are made of rubber and are carried by transverse shafts 34, 35, which are journaled in bearings carried by the main frame. The rolls 32 and 33 are continuously rotated in opposite directions so that their opposing faces pass downwardly to draw the husks of the ear of corn downwardly between them and remove them from the ear. It is apparent that for a definite period each ear is positively held in engagement with the first set of husking rolls 32 and 33 by the pocket 26 of the drum 24 in which it is arranged.

On the next forward step of the drum, the partly husked ear is moved from the first or primary set of husking rolls onto a second set of husking rolls 36, 37 which are mounted on continuously rotating shafts 38, 39 and serve to remove the remainder of any husks on the ears. On the next forward step of the drum 24 the completely husked ears are discharged from the pair of pockets and from the rear of the machine. By providing a dwell or two separate periods in which the ear is positively held in engagement with two pairs of husking rolls, the complete removal of the husks from the ear is insured as well as the complete removal of all remnants of silk.

The driving gearing for the machine is arranged as follows: The numeral 40 represents a main drive shaft which is journaled at the rear end of the main frame and carries a driving pulley 41 which is driven by a belt drive 42 or in any other suitable manner. Between the driving pulley 41 and the main frame a sprocket wheel 43 is fixed to the driving shaft 40 and this sprocket wheel 43 is connected by a driving chain 44 with a small sprocket 45 mounted on the shaft 38 which carries the first husking roll 36 of the second pair of rolls. At the opposite side of the machine the husking roll shafts 34, 35, 38 and 39 are connected by a train of pinions 46, 47, 48 and 49 which compel all of the husking rolls to turn in unison and in the proper direction to strip the husks from the ear as they are successively presented to the two pairs of rolls. On the same side of the machine the main drive shaft 40 carries a sprocket 50 which drives an endless chain 51. This chain 51 passes around and drives the driving sprocket wheel 52 of the Geneva gear 29 and thence around an idler 53. The driving wheel 52 of the Geneva gear is fixed on a transverse shaft 54 on the opposite end of which a sprocket 55 is carried. This sprocket 55 is connected to the main conveyor driving sprocket wheel 15 by a chain 56 and since the train of gearing as described is continuously rotating the main conveyor chains 17 are advanced uniformly and continuously. The driven star wheel 57 of the Geneva gear 29 is mounted on the shaft 25 which carries the drum 24. This star wheel is provided with the usual radial slots 58 and indented faces 59 between the slots. The driving wheel 52 of the Geneva gear carries a roller 60 which on each turn of the driving wheel 52 enters the adjacent slot 58 and gives the star wheel 57 a sixth of a turn. By this means on each rotation of the driving gear wheel 52, the star wheel 57 is advanced a sixth of a turn and the six pairs of pockets 26 in the drum 24 driven by the star wheel 57 are successively presented to the vertical way 21, first pair of husking rolls 32, 33 and the second pair of husking rolls 36, 37. In order to hold the star wheel 57 against rotation while the same is not being advanced by the driving wheel roller 60 a stop 61 is mounted on the driving wheel 52 which stop comprises a semi-cylindrical face 62 which is adapted to contact with the indented faces 59 and hold the star wheel 57 against turning while the roller 60 is traversing its idle stretch. The side of the stop 61 adjacent the roller 60 is cut away as indicated at 63 to receive the points of the star wheel 57 and permit it to be turned by the roller 60.

In order to clean the machine expeditiously, a removable rear cross plate 62 is mounted between the side plates of the machine frame, this plate forming the vertical way 21. For this purpose a fixed cross bar 63 is provided at the rear end of the machine and the plate 62 is offset rearwardly at its upper end to form a pocket 64 which receives this cross rod. On this cross rod 63 is pivotally mounted a pair of latch members or dogs 65 each of which is adapted to hook over a shoulder 66 at each end of the cross plate 62. At opposite ends the cross plate 62 is provided with rearwardly extending side flanges 67 which are disposed against the adjacent sides of the machine frame. At the lower end of each of these side flanges 67 a pair of holes 68 are provided and each of these holes is adapted to receive a fastening bolt 69 which extends through the main frame and secures the lower opposite ends of the rear plate 62 to the machine frame. These openings are so disposed that when the rear plate is bolted through the rearmost holes 68 the plate is in a forward position and consequently the vertical way 21 is constricted. Conversely, by shifting the plate rearwardly and fastening it by its foremost set of holes 68 the vertical way 21 is widened. This adjustability of the effective size of the vertical way 21 has been found to be of importance since when small ears of corn were being husked and the vertical way 21 was too large, they would not always enter the pockets 26 properly, whereas with the present invention the size of the way can be adjusted to the particular size of ears being husked.

A summary of the operation of the machine is as follows: The operator places a pair of ears of corn with their points opposing each other between a pair of conveyor bars 19 of the main conveyor, and preferably with their butts arranged over the sides of the table 12. If desired as the ears are carried along sidewise by the conveyor the ears of corn can be placed, the butts severed and the husks shredded by suitable devices, such as are shown in the parent application, Ser. No. 375,445, but which form no part of the present invention and are not shown.

The ears so positioned and preferably debutted and shredded are then carried over the shoulder 23, around the curved part 20 of the feeding table, through the vertical way 21 and discharged into the two upper pockets 26 at the opposite ends of the drum 24. This drum is rotated step by step in synchronism with the main conveyor by the Geneva gear 29 and the pair of ears are thereby first presented and held in engagement with the first pair of continuously rotating husking rolls 32 and 33 and upon the next step of the drum are held in engagement with the second pair of continuously rotating husking rolls 36 and 37, which latter operate to remove any husks or silk not removed by the first pair of husking rolls. On the next step of the drum 24 the pair of ears are thrown out of their pockets and from the rear end of the machine completely husked.

As a whole the present invention provides a relatively simple and inexpensive machine which rapidly, uniformly and completely removes all of the husk and silk from the ears fed to the same in pairs, the machine is reliable and positive in its operation and is not liable to become clogged with silk or husks and ears are not liable to become misplaced or jammed in the machine and if so misplaced can be readily and quickly removed.

We claim as our invention:

1. In a corn husker, a primary conveyor conveying the ears of corn in spaced relation, continuously rotating husking rolls, a drum having two series of pockets separated by a transverse central partition, said partition being star shaped and the points of said stars being disposed centrally within said pockets, whereby the ends of the ears falling upon said partition are prevented from resting thereon, said drum successively presenting said ears to said husking rolls and means for imparting a step-by-step movement to said drum.

2. In a corn husker, a rotary drum having an annular series of pockets each of which extends parallel with the axis of the drum and receives an ear of corn in a position parallel with the axis of the drum, two pairs of husking rolls arranged under said drum and parallel therewith, one roll of each of said pairs being depressed relative to the other roll and the two rolls of each pair being rotated oppositely to one another and the depressed rolls of the two pairs being also rotated oppositely to one another, the depressed roll of each pair forming a driver and determining the direction of rotation of the ear presented thereto, and step-by-step means for rotating said drum to present the ear in each pocket first to one of said pairs and then to the other, whereby the ear is first rotated in one direction by the driver of one pair of rolls and then in the opposite direction by the driver of the other pair of rolls.

OGDEN S. SELLS.
HENRY J. WHEELER.